United States Patent
Lutz et al.

(10) Patent No.: US 11,173,672 B2
(45) Date of Patent: Nov. 16, 2021

(54) METHOD FOR BONDING USING ONE-COMPONENT EPOXY ADHESIVE MIXTURES

(71) Applicant: DDP SPECIALTY ELECTRONIC MATERIALS US, LLC, Wilmington, DE (US)

(72) Inventors: Andreas Lutz, Freienbach (CH); Daniel Schneider, Freienbach (CH); Irene Maeder, Freienbach (CH); Marcel Aschwanden, Freienbach (CH); Michael Ras, Horgen (CH)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 0 days.

(21) Appl. No.: 17/049,080

(22) PCT Filed: May 16, 2019

(86) PCT No.: PCT/US2019/032556
§ 371 (c)(1),
(2) Date: Oct. 20, 2020

(87) PCT Pub. No.: WO2019/231694
PCT Pub. Date: Dec. 5, 2019

(65) Prior Publication Data
US 2021/0237365 A1    Aug. 5, 2021

Related U.S. Application Data

(60) Provisional application No. 62/677,450, filed on May 29, 2018.

(51) Int. Cl.
| | |
|---|---|
| *B29C 65/48* | (2006.01) |
| *B29C 65/52* | (2006.01) |
| *B29C 65/00* | (2006.01) |
| *C09J 163/00* | (2006.01) |

(52) U.S. Cl.
CPC ...... *B29C 65/4835* (2013.01); *B29C 65/4855* (2013.01); *B29C 65/52* (2013.01); *B29C 66/73112* (2013.01); *C09J 163/00* (2013.01)

(58) Field of Classification Search
CPC .............. C09J 163/00; B29C 66/73112; B29C 65/4835
See application file for complete search history.

(56) References Cited

U.S. PATENT DOCUMENTS

| | | | |
|---|---|---|---|
| 4,701,378 A | 10/1987 | Bagga et al. | |
| 4,734,332 A | 3/1988 | Bagga et al. | |
| 5,112,932 A | 5/1992 | Koenig et al. | |
| 5,202,390 A | 4/1993 | Mulhaupt et al. | |
| 5,278,257 A | 1/1994 | Mulhaupt et al. | |
| 2005/0070634 A1 | 3/2005 | Lutz et al. | |
| 2005/0209401 A1 | 9/2005 | Lutz et al. | |
| 2006/0276601 A1 | 12/2006 | Lutz et al. | |
| 2012/0052305 A1* | 3/2012 | Weber | C08L 63/00 428/414 |

FOREIGN PATENT DOCUMENTS

| | | |
|---|---|---|
| EP | 0197892 | 10/1989 |
| EP | 0308664 | 8/1991 |
| EP | 1498441 | 1/2005 |
| EP | 1916269 | 4/2008 |
| EP | 1916270 | 4/2008 |
| EP | 1916272 | 4/2008 |
| EP | 1916285 | 4/2008 |
| EP | 1728825 | 10/2013 |
| EP | 1896517 | 1/2016 |
| WO | WO2005118734 | 12/2005 |
| WO | WO2007003650 | 1/2007 |
| WO | WO2012091842 | 7/2012 |

* cited by examiner

*Primary Examiner* — Daniel McNally
(74) *Attorney, Agent, or Firm* — Hong Xu

(57) ABSTRACT

Adhesive bonds are applied by mixing two adhesives with different properties and dispensing them to form bondlines between substrate pairs. The adhesives are then thermally cured and cooled. Varying the mix ratio permits one to vary the properties of the adhesive mixture so formed for use in bonding many different substrate pairs. The process allows potentially infinite variations of adhesive properties between those of the respective starting adhesives, simply by varying the mix ratio. The invention is especially adapted for use in manufacturing settings in which adhesives are to be applied in multiple places, but differing adhesive properties are needed among the various bonding areas.

11 Claims, No Drawings

METHOD FOR BONDING USING ONE-COMPONENT EPOXY ADHESIVE MIXTURES

This invention relates to assembly processes that make use of thermally-cured, one-component adhesives.

One-component, toughened epoxy structural adhesives are coming into widespread use in the manufacture of motor vehicles and other products. Their single-component formulation simplifies their use on automated assembly lines, as the need to store, meter and mix separate resin and curative components is avoided.

These adhesives require an elevated temperature (thermal) cure. The adhesive and the substrates to be bonded are heated together to a cure temperature which is often in the range of 140 to 180° C.

The heating causes the substrates to expand. The extent of expansion of each of the substrates depends on its particular material(s) of construction and the increase in temperature experienced by that substrate during the heating process.

Similarly, the substrates contract as they are cooled back down after the curing step is completed. Again, the dimensional change exhibited by each of the substrates will depend on its particular material(s) of construction and the temperature change it experiences when it cools.

The two substrates may expand by different amounts during the heating step and, conversely, may contract by different amounts during the cooling step. This can be for several reasons. The substrates may be made of different materials and therefore have different coefficients of linear expansion. The substrates may not be heated to the same temperature during the curing step due to, for example, differences in thickness, the manner in which the heating step is performed or variances in temperature at different locations within the oven. It is possible, therefore, for the two substrates to exhibit different amounts of expansion and contraction even in cases in which the substrates both are made of the same material.

During the thermal bonding process, the substrates expand as they are heated to the adhesive curing temperature. Because the parts are usually held together firmly until the adhesive has cured, the assembly often becomes distorted during the heating process due to the differential expansion of the two substrates.

This thermally-induced distortion must be reversed when the glued parts are cooled. If the parts were free to move relative to each other when the assembly is cooled back to room temperature, the distortion normally would disappear and the assembled parts would regain their original geometry. The presence of the cured adhesive bond, however, restricts this movement. If the adhesive is too rigid, the distortion is retained when the assembled parts are cooled.

Therefore, as the assembly is cooled, the cured adhesive must be able to stretch enough to allow the substrates to move so the heat-induced distortion is not retained. If the adhesive is too stiff and rigid, the glued part is likely to remain distorted. If the forces produced by the differences in thermal contraction are great enough, it is even possible for the adhesive to fail.

Conversely, if the adhesive is excessively elastic and flexible, it introduces unwanted laxity into the bonded structure. For that reason, the adhesive ideally is designed with only enough elasticity to prevent the part from retaining the heat-induced distortion or failing as it cools.

In some complex manufacturing settings (such as vehicle assembly), adhesives are used to form many different bonds. The substrate pairs often are not the same in all cases. For example, in particular cases the substrate pair may be steel and aluminum, or different grades of steel, or a fiber-reinforced plastic to a metal, etc. The substrate pairs may also vary in their geometry, which can lead to distortion even if each member of the pair is made of the same material.

The amount of distortion created when each of these substrate pairs is heated to cure the adhesive can vary quite substantially due to these differences in materials and geometry, and also because of differences in thermal conditions during the curing step. Using the same adhesive to form all of these bonds therefore is sub-optimal, because a single adhesive will be either too flexible or not flexible enough for at least some of the cases.

Ideally, the adhesives used to form these various bonds are selected separately in each case, to tailor the adhesive properties to the particular requirements of each bond. The adhesive in each case should have enough flexibility to prevent heat-induced distortion from being retained when the assembly is cooled, but should not be unnecessarily flexible so as to introduce unwanted laxity to the bonded structure.

However, it is expensive and largely impractical in a manufacturing setting to stock and apply large numbers of different, specialized adhesives. Doing so would necessitate purchasing, warehousing and handling many different adhesive products and would in addition require duplicate equipment to apply all of these different adhesives.

The invention is a method of bonding substrates, comprising steps of a) providing a first epoxy adhesive, wherein the first epoxy adhesive is a single component, thermally curable adhesive that when cured exhibits an elongation $E_1$ and an elastic modulus $M_1$, b) providing a second epoxy adhesive, wherein the second epoxy adhesive is a single component, thermally curable adhesive that when cured exhibits an elongation $E_2$ and an elastic modulus $M_2$ such that $E_2 > E_1$ and $M_2 < M_1$.

c) combining the first and second epoxy adhesives at a mix ratio of 1:99 to 99:1 by volume in a mixing and dispensing apparatus, to form an adhesive mixture that when cured exhibits an elongation $E_3$ and an elastic modulus $M_3$ such that $E_2 > E_3 > E_1$ and $M_2 < M_3 < M_1$;

d) dispensing the adhesive mixture from the mixing and dispensing apparatus and forming the dispensed adhesive mixture into a layer at a bondline between at least one pair of substrates and e) curing the adhesive mixture at an elevated temperature to form a cured adhesive layer at the bondline and f) cooling the cured adhesive and at least one pair of substrates to below 40° C.

This invention provides a fast, flexible and convenient way to tailor adhesive properties to particular bonding situations. Those properties can be varied simply by adjusting the ratios of the first and second adhesives as they are combined. Adhesives having a wide range of properties, and which are therefore readily tailored for use with many specific combinations of substrates and part geometries, are produced from only two starting adhesives. This greatly reduces cost and complexity. Storage and warehousing costs are reduced because only two starting adhesives are needed instead of many. Simply by varying mixing ratios, the same dispensing equipment and same two starting adhesives can be used to deliver what are in effect many different adhesive formulations, one after the other, without changing the composition of first and second epoxy adhesives fed into the dispensing equipment.

The first and second epoxy adhesives are characterized in being epoxy adhesives, which means they contain one or more epoxy resins and one or more epoxy resin hardeners, both as described more fully below. They each are one-component adhesives that include all components necessary to cure.

The first and second epoxy adhesives are also thermally curable. A thermally curable epoxy adhesive, for purposes of this invention, exhibits a curing onset temperature of at least 130° C. Curing onset temperature is measured by differential scanning calorimetry (DSC) using a heating rate of 10° C./minute. The curing onset temperature is at the intersection of the temperature axis with a line tangent to the midpoint (half-height) of the upslope of the heat flow curve. The adhesive preferably has a curing onset temperature of no more than 170° C., more preferably no greater than 160° C.

Because of their high curing onset temperatures, the first and second epoxy adhesives cure slowly if at all at room temperature (22° C.). Therefore, they each are capable of being stored at room temperature and slightly elevated temperatures (such as up to 40° C.) for a period of at least a day, preferably at least 30 days, with no more than a 30% increase in viscosity (as measured in the manner described in the following examples).

The first epoxy adhesive is characterized in having a cured elongation $E_1$ and a cured elastic modulus $M_1$. The second epoxy adhesive is characterized in having a cured elongation $E_2$ and a cured elastic modulus $M_2$. The second epoxy adhesive is a higher elongation, lower modulus material when cured, such that $E_2 > E_1$ and $M_2 < M_1$.

"Cured" properties refer to properties of the adhesive after full curing and then cooling to room temperature. "Full curing" for purposes of this invention includes curing conditions of 180° C. for 30 minutes, or other curing conditions that result in equivalent cure.

$E_1$ may be, for example, up to 25%, up to 15% or up to 10%, as measured at 23° C. according to DIN EN ISO 527-1 using dumbbell specimen 5a. $E_2$ may be, for example, at least 30%, at least 40%, at least 50% or at least 60% and may be, for example, up to 200%, up to 150% or up to 100%. In some embodiments, $E_2 \geq (2 \times E_1)$. In other embodiments, $E_2 \geq (4 \times E_1)$ and in still other embodiments, $E_2 \geq (6 \times E_1)$. $E_2$ may be, for example, up to $(20 \times E_1)$, up to $(15 \times E_1)$ or up to $(12 \times E_1)$.

$M_1$ may be, for example, at least 250 MPa, at least 500 MPa, at least 1000 MPa or at least 1250 MPa as measured at 23° C. according to DIN EN ISO 527-1 using dumbbell specimen 5a. $M_1$ may be, for example, up to 10,000 MPa, up to 5000 MPa, up to 2500 MPa or up to 2000 MPa. $M_2$ may be, for example, up to 200 MPa, up to 100 MPa, up to 75 MPa or up to 50 MPa. In some embodiments, $M_2 \leq (0.25 \times M_1)$. In other embodiments, $M_2 \leq (0.10 \times M_1)$ and in still other embodiments, $M_2 \geq (0.05 \times M_1)$.

Each of the first and second epoxy adhesives contains at least one non-rubber-modified epoxy resin, by which it is meant that, prior to curing, the epoxy resin is not chemically bonded to a rubber as described below.

A wide range of epoxy resins can be used as a non-rubber-modified epoxy resin, including those described at column 2 line 66 to column 4 line 24 of U.S. Pat. No. 4,734,332, incorporated herein by reference. The epoxy resin should have an average of at least 1.8, preferably at least 2.0, epoxide groups per molecule. The epoxy equivalent weight may be, for example, 75 to 350, preferably 140 to 250 and in some embodiments 150 to 225. If a mixture of non-rubber-modified epoxy resins is present, the mixture should have an average epoxy functionality of at least 1.8, preferably at least 2.0, and an epoxy equivalent weight as in the previous sentence. More preferably each epoxy resin in the mixture has such an epoxy functionality and epoxy equivalent weight.

Suitable non-rubber-modified epoxy resins include diglycidyl ethers of polyhydric phenol compounds such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol; diglycidyl ethers of aliphatic glycols such as the diglycidyl ethers of $C_{2-24}$ alkylene glycols; polyglycidyl ethers of phenol-formaldehyde novolac resins (epoxy novolac resins), alkyl substituted phenol-formaldehyde resins, phenol-hydroxybenzaldehyde resins, cresol-hydroxybenzaldehyde resins, dicyclopentadiene-phenol resins and dicyclopentadiene-substituted phenol resins; and any combination of any two or more thereof.

Suitable epoxy resins include diglycidyl ethers of bisphenol A resins such as are sold by Olin Corporation under the designations D.E.R.® 330, D.E.R.® 331, D.E.R.® 332, D.E.R.® 383, D.E.R. 661 and D.E.R.® 662 resins.

Epoxy novolac resins can be used. Such resins are available commercially as D.E.N.® 354, D.E.N.® 431, D.E.N.® 438 and D.E.N.® 439 from Olin Corporation.

Other suitable non-rubber-modified epoxy resins are cycloaliphatic epoxides. A cycloaliphatic epoxide includes a saturated carbon ring having an epoxy oxygen bonded to two vicinal atoms in the carbon ring, as illustrated by the following structure:

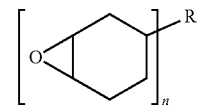

wherein R is hydrogen, an aliphatic, cycloaliphatic and/or aromatic group that may include heteroatoms such as oxygen, nitrogen, and n is a number from 1 to 10, preferably from 2 to 4. When n is 1, the cycloaliphatic epoxide is a monoepoxide. Di- or polyepoxides are formed when n is 2 or more. R preferably contains up to 10 carbon atoms. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Olin Corporation) can be used.

The non-rubber-modified epoxy resin preferably includes a diglycidyl ether of a bisphenol, which may be advanced, or mixture thereof with up to 10 percent by weight of another type of non-rubber-modified epoxy resin. The most preferred epoxy resins are diglycidyl ethers of bisphenol A or bisphenol F, which may be advanced. These can have average epoxy equivalent weights of from about 170 to 600 or more, preferably from 225 to 400.

Each of the first and second epoxy adhesives contains at least one epoxy hardener. The epoxy hardener is a compound that reacts with at least two epoxy groups to form a linkage between them. Suitable epoxy hardeners include materials such as boron trichloride/amine and boron trifluoride/amine complexes, dicyandiamide, melamine, diallylmelamine, guanamines such as dicyandiamide, methyl guanidine, dimethyl guanidine, trimethyl guanidine, tetramethyl guanidine, methylisobiguanidine, dimethylisobiguanidine, tetramethylisbiguandidine, heptamethylisobiguanidine, hexamethylisobiguanidine, acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and/or 4,4'-diaminodiphenylsulphone is particularly preferred. Dicyanadiamide is most preferred.

In some embodiments, the epoxy hardener is a mixture of dicyandiamide and a dihydrazide. The dihydrazide corresponds to a reaction product of an organic dicarboxylic acid with a hydrazine. It preferably has a melting temperature of at least 120° C. or at least 140° C. The dihydrazide may be, for example, adipic dihydrazide, stearic dihydrazide, terephthalic dihydrazide or isophthalic dihydrazide. In such a mixture, the dicyandiamide and dihydrazide are present in a weight ratio of 1:99 to 99:1. A preferred weight ratio is 65:35 to 99:1. More preferred ratios are 50:50 to 95:5, 60:40 to 95:5, or 60:40 to 90:10.

The epoxy hardener is present in each of the first and second epoxy adhesives, in each case in an amount sufficient to cure the respective adhesive. Typically, enough of the epoxy hardener is provided in each of the first and second epoxy adhesives to consume at least 80% of the epoxide groups present in the respective adhesive. A large excess over that amount needed to consume all of the epoxide groups is generally not needed. Preferably, the epoxy hardener constitutes at least about 1.5 weight percent of each of the first and second epoxy adhesive, more preferably at least about 2.5 weight percent and even more preferably at least 3.0 weight percent. The epoxy hardener preferably constitutes up to about 15 weight percent of each of the first and second epoxy adhesives, more preferably up to about 10 weight percent, and most preferably up to about 8 weight percent.

Each of the first and second epoxy adhesives preferably includes at least one curing accelerator. The curing accelerator is one or more materials that catalyze the reaction of the epoxy resin(s) with the epoxy hardener. It is preferably encapsulated or otherwise a latent type that becomes active only upon exposure to elevated temperatures. Among preferred epoxy catalysts are urea compounds. Among these urea compounds are various aromatic disubstituted urea and a cycloaliphatic substituted ureas. Specific examples include p-chlorophenyl-N,N-dimethylurea, 3-phenyl-1,1-dimethylurea, 3,4-dichlorophenyl-N,N dimethylurea, N-(3-chloro-4-methylphenyl)-N',N'-dimethylurea. Other suitable latent curing accelerators include 2,4,6-tris(dimethylaminomethyl) phenol integrated into a poly(p-vinylphenol) matrix (as described in European patent EP 0 197 892), or 2,4,6-tris (dimethylaminomethyl)phenol integrated into a novolac resin, such as described in U.S. Pat. No. 4,701,378.

At least one and preferably each of the first and second epoxy adhesives contains at least one toughener component that has at least one glass transition temperature (by differential scanning calorimetry) of −20° C. or lower. Examples of such tougheners include:

1) one or more reactive urethane group- and/or urea group-containing polyethers having a number average molecular weight of up to 35,000, at least one polyether or diene rubber segment having a weight of at least 1000 atomic mass units, and capped isocyanate groups;

2) one or more core-shell rubbers; and 3) one or more rubber-modified epoxy resins.

The type 1) tougheners include those described, for example, in U.S. Pat. Nos. 5,202,390, 5,278,257, WO 2005/118734, WO 2007/003650, WO2012/091842, U. S. Published Patent Application No. 2005/0070634, U. S. Published Patent Application No. 2005/0209401, U. S. Published Patent Application 2006/0276601, EP-A-0 308 664, EP 1 498 441A, EP-A 1 728 825, EP-A 1 896 517, EP-A 1 916 269, EP-A 1 916 270, EP-A 1 916 272 and EP-A-1 916 285.

The type 1) tougheners are conveniently made in a process that includes the steps of forming an isocyanate-terminated polyether or diene rubber and capping the isocyanate groups with a phenol or polyphenol. The isocyanate-terminated polyether or diene rubber is conveniently made by reacting a hydroxyl- or amine-terminated polyether or hydroxyl- or amine-terminated diene rubber with an excess of a polyisocyanate to produce adducts that have urethane or urea groups and terminal isocyanate groups. If desired, the isocyanate-terminated polyether or diene rubber can be chain-extended and/or branched prior to performing the capping reaction.

The capping agent may be, for example, a monophenol, a polyphenol, an amine, benzyl alcohol, a hydroxy-functional acrylate or methacrylate compound, a thiol compound, and alkyl amide compound having at least one amine hydrogen (such as acetamide) and/or a ketoxime compound. Monophenol or polyphenol capping agents are preferred. Examples of monophenols include phenol, alkyl phenols that contain one or more alkyl groups that each may contain from 1 to 30 carbon atoms, a halogenated phenol, cardanol, or naphthol. Suitable polyphenols contain two or more, preferably two, phenolic hydroxyl groups per molecule and include resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, as well as halogenated derivatives thereof.

The core-shell rubber is a particulate material having a rubbery core. The rubbery core preferably has a $T_g$ (by DSC) of less than −20° C., more preferably less than −50° C. and even more preferably less than −70° C. The $T_g$ of the rubbery core may be below −100° C. The core-shell rubber also has at least one shell portion that preferably has a $T_g$ of at least 50° C. The core of the core-shell rubber may be a polymer or copolymer of a conjugated diene such as butadiene, or a lower alkyl acrylate such as n-butyl-, ethyl-, isobutyl- or 2-ethylhexylacrylate, or may be a silicone rubber. The shell polymer, which is optionally chemically grafted or cross-linked to the rubber core, is preferably a polymer or copolymer of at least one lower alkyl methacrylate such as methyl-, ethyl- or t-butyl methacrylate.

A rubber-modified epoxy resin for purposes of this invention is a compound having at least two epoxide groups separated by an aliphatic chain of at least 300 g/mol, preferably at least 500 g/mol. The aliphatic chain may be, for example, an alkylene group; an alkenyl group; a diene polymer or copolymer; or a polyether such as a polypropylene oxide), a poly(ethylene oxide) or a copolymer of propylene oxide and ethylene oxide. The rubber-modified epoxy resin may have, prior to curing, a glass transition temperature of −20° C. or lower, preferably −30° C. or lower.

Examples of rubber-modified epoxy resins include (i) an epoxy-terminated polyether that contains one or more polyether segments that each having a weight of at least 300 g/mol, preferably at least 500 g/mol, including a reaction product of an amine-terminated polyether and an excess of a polyepoxide; (ii) a reaction product of any of the non-rubber-modified epoxy resins described before with at least one liquid rubber that has epoxide-reactive groups, such as amino or preferably carboxyl groups; (iii) a reaction product of an excess of a non-rubber-modified epoxy resin as described before with a homopolymer or copolymer of a conjugated diene, especially a diene/nitrile copolymer; (iv) an epoxidized fatty acid (which may be dimerized or oligomerized), and (v) an elastomeric polyester that is modified to contain epoxy groups. Mixtures of two or more of the foregoing tougheners can be used in either or both of the first and second epoxy adhesives.

Either or both of the first and second epoxy adhesives may contain one or more mineral fillers. These can perform several functions, such as (1) modifying the rheology of the adhesive in a desirable way, (2) reducing overall cost per unit weight, (3) absorbing moisture or oils from the adhesive or from a substrate to which it is applied, and/or (4) promoting cohesive, rather than adhesive, failure. Examples of suitable mineral fillers include calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel, polyurea compounds, polyamide compounds or metal powders such as aluminum powder or iron powder. Another filler of particular interest is a microballoon having an average particle size of up to 200 microns and density of up to 0.2 g/cc. Heat expandable microballoons which are suitable for reducing density include those commercially available from Dualite Corporation under the trade designation Dualite™, and those sold by Akzo Nobel under the trade designation Expancel™.

All or part of the mineral filler may be in the form of fibers having a diameter of 1 to 50 μm (D50, as measured by microscopy) and an aspect ratio of 6 to 20. The diameter of the fibers may be 2 to 20 μm or 2 to 10 μm, and the aspect ratio may be 8 to 20 or 8 to 16. The diameter of the fiber is taken as that of a circle having the same cross-sectional area as the fiber. The aspect ratio of the fibers may be 6 or more, such as 6 to 25, 6 to 20, 8 to 20 or 8 to 15.

Alternatively, all or part of the mineral filler may be in the form of low aspect ratio particles having an aspect ratio of 5 or less, especially 2 or less, and a longest dimension of up to 100 μm, preferably up to 25 μm.

A monomeric or oligomeric, addition polymerizable, ethylenically unsaturated material is optionally present in either or both of the first and second epoxy adhesives. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator can be included as well, in order to provide a source of free radicals to polymerize this material.

Either or both of the first and second epoxy adhesives can further contain other additives such as dimerized fatty acids, diluents, plasticizers, extenders, pigments and dyes, fire-retarding agents, thixotropic agents, expanding agents, flow control agents, adhesion promoters and antioxidants. Suitable expanding agents include both physical and chemical type agents. Either or both of the first and second epoxy adhesives may also contain a thermoplastic powder such as polyvinylbutyral or a polyester polyol, as described in WO 2005/118734.

In general, increasing the amount of toughener in an epoxy adhesive has the effect of reducing its elastic modulus and increasing its elongation (in each case, when cured). Therefore, the second epoxy adhesive preferably contains a higher proportion of toughener by weight than does the first epoxy adhesive. Thus, for example, the first epoxy adhesive may contain up to 25% by weight tougheners, based on the total adhesive weight, whereas the second epoxy adhesive may contain, for example, 30 to 70% by weight tougheners or 40 to 60% by weight tougheners.

Useful first and second epoxy adhesives for use in this invention include various one-component, thermally-curable structural adhesives sold by The Dow Chemical Company under the Betamate® brand name.

In the process of this invention, the first and second epoxy adhesives are combined in a mixing and dispensing apparatus to form an adhesive mixture that is then dispensed and applied to form an adhesive bond at a bondline between at least one pair of substrates.

"Mix ratio", as used herein, refers to the ratio of the volumes of the first epoxy adhesive and second epoxy adhesive that are combined in the mixing and dispensing apparatus. The mix ratio may be as low as one part by volume of first epoxy adhesive to 99 parts by volume of the second epoxy adhesive (1:99) or as high as 99 parts by volume of the first epoxy adhesive to 1 part by volume of the second epoxy adhesive (99:1). The mix ratio may be any intermediate value. The mix ratio may be at least 5:95, at least 10:90, at least 20:80, at least 25:75, at least 33:67 or at least 40:60, and may be, for example, up to 95:5, up to 90:10, up to 80:20, up to 75:25, up to 67:33 or up to 60:40.

The adhesive mixture, when cured, is characterized in having an elongation $E_3$ and an elastic modulus $M_3$ such that $E_2 > E_3 > E_1$ and $M_2 < M_3 < M_1$. The values of $E_3$ and $M_3$ will of course depend on the respective elongation and elastic modulus values of the first and second adhesives, and the mix ratio. Through appropriate selection of mix ratio, the elongation $E_3$ can attain any value between $E_1$ and $E_2$ and, similarly, the elastic modulus $M_3$ can attain any value between $M_1$ and $M_2$. $E_3$ and $M_3$ are related in that $M_3$ generally decreases as $E_3$ increases. Therefore, increasing the mix ratio toward more of the first adhesive tends to lead to a decrease in $E_3$ and an increase in $M_3$.

Once the first and second epoxy adhesives have been combined to form the adhesive mixture, it is dispensed from the mixing and dispensing apparatus to form a layer at a bondline between two substrates. The adhesive mixture can be dispensed, for example, by pumping, extrusion or spraying. Once the adhesive composition is applied to the surface of at least one of the substrates, the substrates are contacted such that a layer of the adhesive forms at a bondline between the substrates.

The mixing and dispensing apparatus is any apparatus adapted to receive the first and second epoxy adhesives, combine them to form an adhesive mixture and dispense the mixture. The apparatus may be manually operated or may be automated. The mixing and dispensing apparatus may include, for example, mixing means for combining the first and second epoxy adhesives to form the adhesive mixture; pumping means for transferring each of the first and second epoxy adhesives from a source of supply to the mixing mean; and conduit and dispensing means for transporting the adhesive mixture from the mixing means and applying the mixture to a substrate.

The mixing means may include, for example, one or more of an static mixer, an impingement mixer, a spray mixer and the like. The pumping means may be, for example, one or more manually-, pneumatically- or otherwise activated pistons that force the first and second adhesives, respectively, from a source of supply and into the mixing means; as well as various types of pumps such as positive displacement pumps. This pumping means may in addition supply energy for combining the first and second epoxy adhesives and dispensing them from the apparatus.

Apparatus as are useful for combining and dispensing two-component adhesives are useful in this invention. Suitable apparatus include, for example, dual-cartridge caulking guns, which may be manually operated or machine operated; as well as automated two-component adhesive dispensing systems such as, for example, those sold by Dymax Corporation (Torrington, Conn.), Ivek Corporation (North Springfield, Vt.); Nordson Corporation, Kirkco Corporation, (Monroe N.C.); Henkel Corporation (Bay Point, Calif.) as well as many others.

The mixing and dispensing apparatus preferably is a variable ratio type, i.e., one adapted to allow the mix ratio to be changed. In such embodiments, the apparatus may be adapted to allow the mix ratio to be changed to two or more fixed values. Alternatively the apparatus may be adapted to permit the mix ratio to be changed to any arbitrarily-chosen value within a range of mix ratios.

After application, the adhesive is cured by heating it to at or above its curing temperature. Although lower temperatures can be used in some instances, particularly when longer curing times can be tolerated, it is generally preferable to perform the curing step by heating the adhesive to at least 130° C., preferably at least 160° C. The heating temperature may be as high as 220° C. or more, but as an advantage of this invention is the lower curing onset temperature, the curing temperature preferably is up to 200° C., up to 190° C. or up to 180° C. Curing time of course varies with temperature (as well as with the composition of the adhesive mixture and the mass of adhesive to be cured) but in general may be from one minute to one hour at the aforementioned temperatures.

The method of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or to bond automotive parts onto automobiles. Such parts can be steel, coated steel, galvanized steel, aluminum, coated aluminum, plastic and filled plastic substrates.

The invention is particularly suitable for bonding substrates that undergo thermally-induced distortion when heated to the adhesive curing temperature. In some cases, the members of the substrate pair have significantly different CLTEs, and thus exhibit greatly different amounts of expansion during the curing step (and differing amounts of contraction when the bonded assembly is cooled after curing). The members of the substrate pair may have coefficients of linear thermal expansion (CLTEs) that are different from each other by at least $5\times10^{-6}$ m/m-K, at least $10\times10^{-6}$ m/m-K or at least $20\times10^{-6}$ m/m-K, as measured by ASTM E831.

Examples of substrate pairings include pairings of different metals such as steel and aluminum; steel and magnesium; and aluminum and magnesium; pairings of a metal such as steel, magnesium, aluminum or titanium with a polymeric material such as thermoplastic organic polymer or a thermoset organic polymer; and pairing of a metal such as steel aluminum, magnesium or titanium and a fiber composite such as a carbon-fiber composite or a glass fiber composite.

Thermally-induced distortion can also occur due to differences in temperature between the members of the substrate pair, whether or not the members of the pair are made of the same or different materials. These differences in temperature may occur, for example, because the members of the substrate pair have different thicknesses or other geometric differences, because of the particular manner in which the heating step is performed, and/or because of variances in temperature at different locations within the oven. Thicker substrates, for example, may not become heated to the same temperature as thinner ones during a curing process, which can lead to heat-induced distortion.

The thermally-induced distortion can be "locked in" to a glued assembly if the adhesive is not flexible enough to release the stresses when the assembly is cooled. On the other hand, excessive flexibility is not wanted as that introduces unwanted laxity in the glued assembly.

It is readily appreciated that a single adhesive will not be optimized for use in gluing pairs of substrates that differ in the amount of thermally-induced distortion that occurs as the adhesive is heat-cured. Although the adhesive may have a suitable elongation for one pair of substrates, other pairs that are made of different materials that lead to a greater or lesser amount of distortion will require an adhesive having different elongation properties. It is preferable to apply in each case an adhesive that is flexible enough to accommodate the stress so the distortion is not locked into the assembly, but at the same time is not unnecessarily flexible. In general, higher elongation is wanted in the cured adhesive when the thermally-induced distortion is greater, and lower elongation and therefore higher modulus is wanted when the distortion is smaller.

The same concern exists when large pairs of substrates are glued. Different areas of assembly may experience different amounts of distortion because, for example, their geometries are non-uniform and/or the curing conditions are not identical (due to, for example, non-uniformities in the temperature in a curing oven). This case calls for different adhesives to be applied in different areas of the assembly to accommodate the greater and lesser amounts of thermally-induced distortion that takes place during the curing step. In general, higher elongation is wanted in the cured adhesive when the thermally-induced distortion is greater, and lower elongation and therefore higher modulus is wanted when the distortion is smaller.

The method of the invention is particularly well adapted to each of the foregoing scenarios. Thus, in certain aspects, the invention is a manufacturing process wherein multiple adhesive bonds are to be formed, and (i) the substrate pairs are not the same in each instance and/or (ii) the curing conditions are not the same in each instance. In such embodiments, steps c)-e) are performed multiple times to apply the dispensed adhesive mixture to multiple pairs of substrates, and the mix ratio in step c) is changed at least once such that the adhesive mixture applied to at least one of the multiple pairs of substrates has a composition different than the adhesive mixture applied to at least one other of the multiple pairs of substrates. The ability to vary the mix ratio in step c) allows the composition of the adhesive mixture to be matched to the requirements of each particular set of substrates and/or curing conditions, through the use of only two different starting materials.

In such embodiments, the mix ratio in step c) advantageously is selected such that the elongation of the adhesive mixture so formed is higher (i.e., contains a higher proportion of the second epoxy adhesive) when applied to a pair of substrates that exhibit more thermally-induced deformation, and lower (i.e., contains a lesser proportion of the second epoxy adhesive) when applied to a pair of substrates that exhibit less deformation. The amount of thermally-induced deformation may be estimated from the coefficients of thermal expansion of the members of the substrate pair and/or determined empirically.

Thus, in a particular aspect, steps c), d) and e) are performed on a first substrate pair, and repeated on at least one subsequent substrate pair, with the mix ratio being changed when step c) is repeated for at least that one subsequent substrate pair.

Preferably, the mix ratio is changed to include more of the second epoxy adhesive when the subsequent substrate pair exhibits more thermally-induced distortion than the first substrate pair, and conversely is changed to include more of the first epoxy adhesive when the subsequent substrate pair exhibits less thermally-induced distortion than the first substrate pair.

The invention can be used analogously in the case of a single substrate pair that exhibits areas of differing thermally-induced distortion. In such embodiments, steps c)-e) are performed multiple times to apply the dispensed adhesive mixture to two or more different regions of a single pair of substrates, and the mix ratio in step c) is changed at least once such that the adhesive mixture applied to at least one of those regions has a composition different than the adhesive mixture applied to at least one other region.

As before, the mix ratio in step c) advantageously is selected such that the elongation of the adhesive mixture so formed is higher (i.e., contains a higher proportion of the second epoxy adhesive) when applied to the region which exhibits more thermally-induced deformation, and lower (i.e., contains a lesser proportion of the second epoxy adhesive) when applied to a the region that exhibits less deformation.

Thus, in a particular aspect, steps c) and d) are performed on a first region of a substrate pair, and repeated on at least one second, different region of substrate pair, with the mix ratio being changed when step c) is repeated. If more thermally-induced distortion is seen in the second region, the mix ratio is changed to favor greater elongation, i.e., include more of the second epoxy adhesive. Conversely, when less thermally-induced distortion is seen in the second region, the mix ratio is changed to favor lower elongation, i.e., include more of the first epoxy adhesive.

The invention has particular applicability in manufacturing complex assemblies such as vehicles, in which adhesives are applied in multiple areas of the assembly. This invention permits those adhesive to be applied easily to multiple areas of the assembly using a single apparatus, and further permits the composition of the adhesive applied at each of those areas to be varied within a broad range, to tailor the adhesive applied at each area to the demands required of that particular adhesive bond. An application of particular interest is bonding of automotive or other vehicular frame components to each other or to other components. The components to be bonded may include unlike materials that have differing CLTEs as described before and may also or in addition include large components that require different adhesive properties in different regions.

The following examples are provided to illustrate the invention but are not intended to limit the scope thereof. All parts and percentages are by weight unless otherwise indicated. All molecular weights are number averages unless otherwise indicated.

Epoxy Adhesive A is a mixture of epoxy resins, toughening agents and filling agents as generally described, for example, in U. S. Published Patent Application No. 2005/0070634, U. S. Published Patent Application No. 2005/0209401 and U. S. Published Patent Application 2006/0276601. The epoxy curing agent in Epoxy Adhesive A is dicyandiamide. Epoxy Adhesive A contains as curing accelerators a mixture of an aromatic disubstituted urea and a cycloaliphatic substituted urea. Epoxy Adhesive A exhibits a latent, heat-activated cure at a temperature above 100° C. Epoxy Adhesive A exhibits an elongation to break ($E_1$) of 7% and an elastic modulus ($M_1$) of 1450 MPa when fully cured.

Epoxy Adhesive B is a mixture of epoxy resins, toughening agents and filling agents as generally described, for example, in U. S. Published Patent Application No. 2005/0070634, U. S. Published Patent Application No. 2005/0209401 and U. S. Published Patent Application 2006/0276601. The epoxy curing agent in Epoxy Adhesive B is dicyandiamide. Epoxy Adhesive B contains as curing accelerators a mixture of an aromatic disubstituted urea and a cycloaliphatic substituted urea. Epoxy Adhesive B exhibits a latent, heat-activated cure at a temperature above 100° C. Epoxy Adhesive B contains a higher proportion of toughening agents and a lower proportion of epoxy resin than Epoxy Adhesive A. Because of these formulation differences Epoxy Adhesive B exhibits an elongation to break ($E_2$) of 60% and an elastic modulus ($M_2$) of 43 MPa when fully cured.

Example 1 is prepared by mixing Epoxy Adhesives A and B at a 75:25 volume ratio.

Example 2 is prepared by mixing Epoxy Adhesives A and B at a 50:50 volume ratio.

Example 3 is prepared by mixing Epoxy Adhesives A and B at a 25:75 volume ratio.

Casson viscosities and yield stresses are measured for Epoxy Adhesives A and B and Examples 1-3, using a Bohlin CS-50 rheometer, C/P 20, up/down 0.1-20 $s^{-1}$, with data evaluated according to the Casson model.

Impact peel testing is performed for each adhesive sample. The substrates are 1.0 mm-thick HX420 Z100 LAD steel coupons. The test coupons for the impact peel testing are 90 mm×20 mm with a bonded area of 30×20 mm. They are cleaned with heptane. The adhesive sample is then applied to the bond area of one coupon and squeezed onto the other coupon to prepare each test specimen, with spacers present to maintain an adhesive layer thickness of 0.3 mm. The assembled test specimens are cured at 180° C. for 30 minutes. The impact peel testing is performed in accordance with ISO 11343 wedge impact method. Testing is performed at an operating speed of 2 m/sec with samples at a temperature of 23° C.

Lap shear specimens are using one 1.2 mm-thick HX420 Z100 LAD substrate and one 1 mm-thick HC450X+ZE 75/75 substrate. The specimens are made by sprinkling glass beads (0.2 mm diameter) onto one of the coupons, applying the adhesive sample, and then positioning the second coupon over top the adhesive. The bonded area in each case is 25×10 mm, and the adhesive layer thickness is controlled by the glass beads to 0.2 mm. The test specimens are cured for 30 minutes at 180° C. and evaluated for lap shear strength in accordance with DIN EN 1465. Testing is performed at 23° C. and a test speed of 10 mm/minute.

Elastic modulus, elongation and tensile strength of each of Epoxy Adhesives A and B and Examples 1-3 are measured by curing samples of each of the adhesives at 180° C. for 30 minutes. The cured samples are cooled to room temperature and cut into dumbbell specimens (5a per DIN EN ISO 527-1). Properties are measured according to DIN EN ISO 527-1.

Results of the foregoing testing are as indicated in Table 1:

TABLE 1

| Property | Result | | | | |
|---|---|---|---|---|---|
| | Epoxy Adhesive A | Ex. 1 | Ex. 2 | Ex. 3 | Epoxy Adhesive B |
| Ratio, Epoxy Adhesive A:Epoxy Adhesive B | 100:0 | 75:25 | 50:50 | 25:75 | 0:100 |
| Elastic Modulus, MPa | 1450 | 753 | 360 | 134 | 43 |
| Elongation, % | 7 | 13 | 24 | 38 | 60 |
| Tensile Strength, MPa | 23 | 18 | 14 | 11 | 9 |
| 45° C. Casson Viscosity, Pa·s | 124 | 146 | 190 | 243 | 318 |
| 45° C. Yield Stress, Pa | 667 | 586 | 491 | 464 | 560 |
| Lap Shear Strength, MPa | 23.4 | 20.4 | 16.8 | 17.6 | 14.4 |
| Impact Peel Strength, N/mm | 28 | 28 | 29 | 39 | 31 |

As the data in Table 1 shows, blending the starting epoxy adhesives at varying ratios allows for a tailoring of properties.

The effect of varying the modulus by blending starting adhesives having different elastic moduli and elongations is evaluated as follows:

20 mm×100 mm steel panels having a thickness of 0.5-0.8 mm are bonded to 20 mm×100 mm aluminum panels having a thickness of 0.8-1 mm, using each of Epoxy Adhesive A and Examples 1-3. The specimens are made by applying the adhesive sample to one of the panels, sprinkling glass beads (0.2 mm diameter) onto the adhesive bead, positioning the panel coupon over top the adhesive and compressing under a 5 kg weight. The test specimens are cured for 30 minutes at 180° C. and cooled to room temperature. The samples are then evaluated visually for deformation.

The panels glued with Epoxy Adhesive A deform badly. Deformation decreases with the different adhesives as follows: Epoxy Adhesive A>Ex. 3>Ex. 2>Ex. 1. The panels glued with Example 1 exhibit very little deformation. Thus it is seen that by adjusting the elastic modulus and elongation of the adhesive, deformation can be increased or decreased. For this pair of substrates, which are significantly different in their respective coefficients of linear thermal expansion (CLTEs), a higher elongation, lower modulus adhesive is seen to minimize deformation.

What is claimed is:

1. A method of forming an adhesive bond
   a) providing a first epoxy adhesive, wherein the first epoxy adhesive is a single component, thermally curable adhesive that when cured exhibits an elongation $E_1$ and an elastic modulus $M_1$,
   b) providing a second epoxy adhesive, wherein the second epoxy adhesive is a single component, thermally curable adhesive that when cured exhibits an elongation $E_2$ and an elastic modulus $M_2$ such that $E_2>E_1$ and $M_2<M_1$;
   c) combining the first and second epoxy adhesives at a volume ratio of 1:99 to 99:1 in a two-component dispensing apparatus, to form an adhesive mixture that when cured exhibits an elongation $E_3$ and an elastic modulus $M_3$ such that $E_2>E_3>E_1$ and $M_2<M_3<M_1$;
   d) dispensing the adhesive mixture from the two-component dispensing apparatus and applying the dispensed adhesive mixture to form an adhesive bond at a bondline between at least one pair of substrates;
   e) curing the adhesive mixture at an elevated temperature to form a cured adhesive layer at the bondline and
   f) cooling the cured adhesive and at least one pair of substrates to below 40° C.

2. The method of claim 1 wherein in steps c)-e) are performed multiple times to apply the dispensed adhesive mixture to multiple pairs of substrates, and the volume ratio in step c) is changed at least once such that the adhesive mixture applied to at least one of the multiple pairs of substrates has a composition different than the adhesive mixture applied to at least one other of the multiple pairs of substrates.

3. The method of claim 2 wherein the adhesive mixture applied to at least one of the multiple pairs of substrates, when cured, exhibits an elongation E3a and an elastic modulus M3a which are different than the elongation E3b and elastic modulus M3b, respectively, of the adhesive mixture applied to at least one other of the multiple pairs of substrates.

4. The method of claim 2 wherein steps c), d) and e) are performed on a first substrate pair, and subsequently repeated on at least one subsequent substrate pair, wherein the mix ratio is changed when step c) is repeated on said at least one subsequent substrate pair.

5. The method of claim 4 wherein subsequent substrate pair exhibits more thermally-induced distortion than the first substrate pair, and the mix ratio is changed to include more of the second epoxy adhesive.

6. The method of claim 4 wherein the subsequent substrate pair exhibits less thermally-induced distortion than the first substrate pair and the mix ratio is changed to include less of the second epoxy adhesive.

7. The method of claim 1 wherein in steps c)-e) are performed multiple times to apply the dispensed adhesive mixture to multiple regions of a pair of substrates, and the volume ratio in step c) is changed at least once such that the adhesive mixture applied to at least one of the multiple regions has a composition different than the adhesive mixture applied to at least one other of the multiple regions.

8. The method of claim 7 wherein the adhesive mixture applied to at least one of the multiple regions, when cured, exhibits an elongation E3a and an elastic modulus M3a which are different than the elongation E3b and elastic modulus M3b, respectively, of the adhesive mixture applied to at least one other of the multiple regions.

9. The method of claim 7 wherein steps c) and d) are performed on a first region of a substrate pair, and subsequently repeated on at least one second region of the substrate pair, wherein the mix ratio is changed when step c) is repeated on said second region.

10. The method of claim 9 wherein second region exhibits more thermally-induced distortion than the first region, and the mix ratio is changed to include more of the second epoxy adhesive.

11. The method of claim 9 wherein the second region exhibits less thermally-induced distortion than the first region and the mix ratio is changed to include less of the second epoxy adhesive.

* * * * *